Sept. 25, 1945.  H. O. PETERSON  2,385,641
AUTOMATIC RECORDING SYSTEM
Filed Feb. 11, 1942
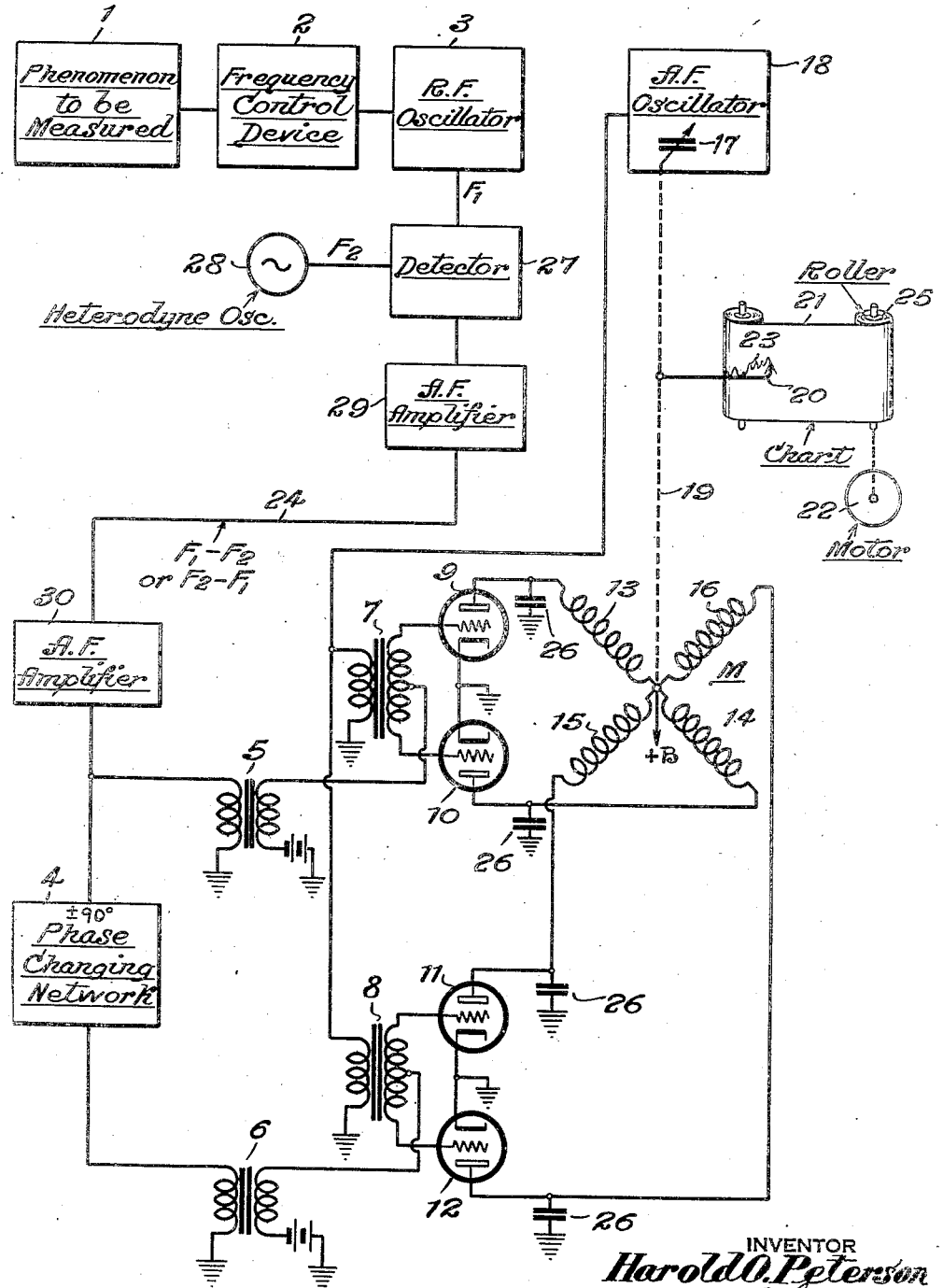
INVENTOR
Harold O. Peterson
BY
ATTORNEY Patented Sept. 25, 1945

2,385,641

UNITED STATES PATENT OFFICE 2,385,641

AUTOMATIC RECORDING SYSTEM

Harold O. Peterson, Riverhead, N. Y., assignor to Radio Corporation of America, a corporation of Delaware Application February 11, 1942, Serial No. 430,347

2 Claims. (Cl. 234—1.5)

This invention relates to improvements in automatic recording systems.

It is known in recorders to have a motor which is caused to balance a bridge and at the same time move the indicating pen. Such recorders are manufactured by the Brown Instrument Company and by Leeds and Northrup Company. In these recorders no balancing force will be exerted until the system has become unbalanced by a definite minimum amount, a condition which is a disadvantage when it is desired to use these known recorders for many purposes.

In the system of this invention, the balancing force is present immediately, no matter how small the incremental change of conditions. Another advantage of the recorder system of the present invention is that it lends itself to the recording of factors other than amplitudes of voltage or current. For instance, it could readily be used to indicate a mechanical change of position such as would be required in a water level gage, a wind direction indicator, a thickness gage, etc.

Very generally, in the recording system of the invention, the phenomenon to be measured is caused to vary the frequency of an oscillator and the recorder is caused to make another oscillator match the frequency of the oscillator controlled by the phenomenon being recorded.

A more detailed description of the invention follows in conjunction with a drawing, whose single figure illustrates one embodment of the present invention.

Referring to the drawing in more detail, the phenomenon being measured (let us say, for example, a source of voltage or current whose amplitude is to be measured) is represented by 1 and through frequency control device 2 is caused to vary the frequency of a vacuum tube oscillator 3. Oscillator 3 generates radio frequency oscillations. The control device 2 might be some form of reactance vacuum tube circuit such as is used in frequency modulation for communications purposes, in the event we desire to measure amplitude of voltage or current, or it might be in the form of a mechanically variable condenser in case we desire to measure the thickness of a gage or to provide a wind direction indicator. In the last case, the vane of the direction indicator can be linked through a shaft and gear arrangement to a specially designed rotor cam of a variable condenser.

The output of oscillator 3 is fed to a detector 27 where it beats with oscillations produced by a local heterodyne oscillator 28 to produce an audio beat frequency which is amplified in apparatus 29 and then conducted through transmission line 24 to a pair of balanced modulators 9, 10 and 11, 12. This beat frequency may, for example, be 1000 cycles at a particular reference condition of the phenomenon to be measured, and will vary from this particular frequency whenever there is a variation in the pnenomenon to be measured. These modulators are fed through audio frequency transformers 5 and 6. The feed to one of these transformers is through a phase changing network 4 which either advances or retards the phase by 90° relative to the energy fed to the other transformer.

In the recorder system, there is another vacuum tube oscillator 18 which feeds the balanced modulators through transformers 7 and 8. Oscillator 18 generates a frequency identical with the frequency in lead 24 when the recorder system is in balance. This oscillator includes a variable condenser 17 which is driven from a split phase motor M through mechanical linkage, such as a shaft 19, which also carries the recorder pen 20 which is shown making a record 23 on chart 21. The chart is slowly advanced on a roller 25, in turn driven by a motor 22.

The linkage or shaft 19 is driven from the rotor of the two-phase motor M comprising windings 13, 14, 15 and 16. This rotor has teeth cut in it so that it will rotate in synchronism with any two-phase alternating current appearing in the windings. The Alnico motor manufactured by General Electric Company of Schenectady, New York, is an example of this type of motor. This type of motor is also manufactured by the Western Electric Company.

It is a characteristic of balanced modulators connected as shown, that the output beat frequency from the two balanced modulators will appear at 90° phase relationship if transformers 5 and 6 are supplied with voltages at 90° phase relationship. In the operation of the balanced modulators 9, 10 and 11, 12, let us assume that the output frequency from oscillator 18 which is impressed on the grids of the two balanced modulators through audio frequency transformers 7 and 8 is the same as the frequency in lead 24 which is impressed on the same grids through transformers 5 and 6. In this condition, there will be no beat frequency in the outputs of the modulators, and only direct current will flow through certain ones of the coils of the motor M. This motor, under these circumstances, will be stationary. Now, if the output frequency of oscillator 18 differs from that in lead 24 because of a change in the phenomenon to be measured, there will be a beat frequency in the outputs of the two balanced modulators which will cause rotation of the rotor of the motor by virtue of the fact that the phase of the beat frequency current in the output of one balanced modulator will be displaced 90° from the phase of the beat frequency current in the output of the other balanced modulator. The overall effect will be that the split phase motor M, having windings 13, 14, 15 and 16, will so adjust condenser 17 that oscillator 18 will assume exactly the same frequency which appears in lead 24.

Condensers 26, 26 connected to the anodes of the vacuum tubes comprising the balanced modulators serve to by-pass to ground the frequencies corresponding to those produced by oscillator 18 and in lead 24, thus assuring that only the beat frequency in the outputs of the balanced modulators affect the windings of the motor M.

By increasing the length of transmission line 24, the recording device can be made to record phenomena occurring at a considerable distance, it being only necessary to transmit the frequency of the output of detector 27. Loss of amplitude due to attenuation in transmission line 24 can be made up by amplification at 30 and the level supplied to transformer 5 and 6 can be kept constant by means of a limiter in audio frequency amplifier 30 or by automatic gain control in the same amplifier.

By shaping the plates of condenser 17 or by choosing the proper characteristic of frequency control device 2, the response characteristic of the recorder as indicated on chart 21 can be made anything desired. It can, for instance, be made linear, square law, or logarithmic. Obviously, a variable inductance may be used in place of variable condenser 17 for affecting the frequency of oscillator 18, and in the case of oscillators whose frequency can be varied by a resistor, then the resistor can be used in place of condenser 17.

The present invention possesses the following advantages among others: (1) It provides an extremely sensitive recording device which functions immediately upon a slight change in the phenomenon to be measured; (2) it is particularly adaptable to recording at a point remote from the location of the effect to be measured because it is sensitive to frequency changes and not to amplitude changes; and (3) it is fast in operation and can be made to be sensitive over a narrow frequency range.

What is claimed is:

1. A system for recording variations in frequency from a norm, comprising means for producing an audio frequency current whose variations in frequency are to be recorded, a pair of balanced modulators, a line feeding said audio frequency current to said modulators, a phase changing network in said line for changing the phase of the energy fed to one balanced modulator by 90° relative to the energy fed to the other balanced modulator, a two-phase motor having its windings coupled to the outputs of said balanced modulators, a variable audio frequency oscillator having a frequency determining element linked to the rotor of said motor, said variable oscillator producing an audio frequency current having a frequency of the order of the audio frequency in said line, a circuit feeding energy from said variable oscillator to the inputs of said balanced modulators, and a recording device also linked to the rotor of said motor whereby an output beat frequency from said two balanced modulators caused by a difference in the frequencies of said variable oscillator and the output of said means produces rotation of said motor to change the frequency of said variable oscillator to match the frequency in said line, as a consequence of which said recording device indicates the degree of control employed on said variable oscillator.

2. A system for recording variations in frequency from a norm, comprising means for producing an audio frequency current whose variations in frequency are to be recorded, a pair of balanced modulators, a circuit feeding said audio frequency current to the inputs of said modulators, a two-phase motor having its windings coupled to the outputs of said balanced modulators, a variable audio frequency oscillator having a frequency determining element linked to the rotor of said motor, said variable frequency oscillator producing an audio frequency current having a frequency of the order of the audio frequency in said circuit, a circuit feeding energy from said variable oscillator to the inputs of said balanced modulators, means in one of said circuits for shifting the phase of the energy fed to the input of one modulator by 90° relative to that fed to the input of the other modulator, and a recording device also linked to the rotor of said motor whereby an output beat frequency from said two balanced modulators caused by a difference in the frequencies of said variable oscillator and the output of said first means produces rotation of said motor to change the frequency of said variable oscillator to match the frequency in said first circuit, as a consequence of which said recording device indicates the degree of control employed on said variable oscillator.

HAROLD O. PETERSON.